(12) United States Patent
Mori et al.

(10) Patent No.: US 8,036,093 B2
(45) Date of Patent: Oct. 11, 2011

(54) OPTICAL HEAD DEVICE AND RECORDING/REPRODUCTION DEVICE

(75) Inventors: Eishin Mori, Tokyo (JP); Fumitomo Yamasaki, Nara (JP); Yoshiaki Komma, Osaka (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 12/536,926

(22) Filed: Aug. 6, 2009

(65) Prior Publication Data

US 2010/0034073 A1     Feb. 11, 2010

(30) Foreign Application Priority Data

Aug. 6, 2008     (JP) .................................. 2008-202831

(51) Int. Cl.
*G11B 7/00* (2006.01)
(52) U.S. Cl. ............................... 369/112.22; 369/112.29
(58) Field of Classification Search ............... 369/112.22
See application file for complete search history.

(56) References Cited

U.S. PATENT DOCUMENTS

| | | | |
|---|---|---|---|
| 2005/0249099 A1* | 11/2005 | Komma | 369/112.08 |
| 2007/0253311 A1* | 11/2007 | Horinouchi et al. | 369/112.22 |
| 2009/0110011 A1 | 4/2009 | Nishikawa et al. | |

FOREIGN PATENT DOCUMENTS

WO     2008/001636     1/2008

\* cited by examiner

*Primary Examiner* — Joseph Haley
(74) *Attorney, Agent, or Firm* — Wenderoth Lind & Ponack, L.L.P.

(57) ABSTRACT

An optical head device includes a first light source and a second light source respectively emitting a first light beam and a second light beam, a luminous flux separating section selectively separating the first and second light beams for which the same optical path is used, to first and second optical paths, respectively, and a first objective lens converging the first light beam that has been separated to the first optical path on the first optical information recording medium. Further, the optical head device includes a second objective lens made of resin and converging the second light beam separated to the second optical path on the second optical information recording medium, and a first filtering section formed on a beam exit face of the second objective lens and reducing the transmittance of the first light beam to be lower than transmittance of the second light beam.

24 Claims, 5 Drawing Sheets

OPTICAL HEAD DEVICE AND RECORDING/REPRODUCTION DEVICE

BACKGROUND OF THE INVENTION

1. Field of the Invention

The present invention relates to an optical head device for use in recording and/or reproducing on and/or from an optical information recording medium, such as an optical disc, and to a recording and/or reproduction device provided with such optical head device.

2. Description of the Related Art

Commercially available high density and high capacity optical information recording media include optical discs such as DVDs, Blu-ray Discs (hereinafter referred to as BDs), and the like. The use of these optical discs have been increasing rapidly in recent years as recording media for recording images, music, computer data and the like. In response, developments have been made eagerly to realize smaller size and lighter weight of compatible optical head devices for recording and/or reproducing information on and/or from optical recording media of different standards such as BD, DVD, CD and the like.

Here, the laser beams for use in recording and reproducing on and from BDs, DVDs and CDs respectively have different wavelengths. Specifically, BDs use a laser beam having a wavelength of 405 nm, DVDs use a laser beam having a wavelength of 660 nm, and CDs use a laser beam having a wavelength of 785 nm. For an optical head device compatible with three wavelengths, an optical path is used both for the laser beam for use in recording and reproducing on and from CDs and DVDs and for the laser beam for use in recording and reproducing on and from BDs, and the components are used in common so as to reduce the number of components and to realize cost reduction.

For recording and/or reproducing on/from the CDs and DVDs, a material that strikes a balance between durability and high performance has already been developed with respect to the light having the wavelength for use in recording and reproducing on and from the CDs and DVDs. However, such optimal material for the CDs and DVDs does not necessarily have sufficient durability against the light of the blue wavelength range for use in recording and reproducing with respect to the BDs.

In fact, when such an optical component made of an optimal material for the CDs and DVDs is used in a three-wavelength compatible optical head device for CDs, DVDs, and BDs, it has discovered that the durability of the optical component, through which a light beam of the blue wavelength range for use in recording and reproducing with respect to the BDs may pass, is liable to deteriorate. Specifically, when adopting such optical component made of an optimal material for the CDs and DVDs, a problem arises in that its inherent durability and characteristics cannot be ensured in the three-wavelength compatible optical head device of CDs, DVDs, and BDs.

International Publication No. 2008/001636 describes a conventional example of a compatible optical head device provided with a light source which emits light in a blue wavelength range, which prevents deterioration of the durability of the optical component made of a material optimized for an optical path of the laser beam for use in recording and reproducing on and from CDs and DVDs. In this conventional example, an optical multilayer film is formed on an optical component such as a polarized hologram with a phase plate so as to prevent deterioration of the organic material used in the optical component by shielding blue stray light with the optical multilayer film even if such blue stray light is generated from the blue laser light as emitted from blue laser beam source.

However, it is extremely difficult to effectively prevent such material optimized for the CDs and DVDs from deteriorating when used for the three-wavelength compatible optical head device for CDs, DVDs, and BDs. In particular, it has been discovered that even with a small amount of light in the blue wavelength range, the objective lens made of resin, which is an essential component of the optical head device, may deteriorate.

SUMMARY OF THE INVENTION

An object of the present invention is to realize a high performance optical head device, which is capable of recording and reproducing on and from different types of information recording media with improved durability.

In order to realize the foregoing object, an optical head device according to one aspect of the present invention, which is capable of recording and reproducing on and from a first optical information recording medium and a second optical information recording medium of mutually different types includes: a first light source for emitting a first light beam having a wavelength $\lambda 1$ of 390nm to 420nm; a second light source for emitting a second light beam having a wavelength $\lambda 2$ that is longer than the wavelength $\lambda 1$; an optical system in which the first light beam and the second light beam share the same optical path; a luminous flux separating section for selectively separating the first light beam and the second light beam entering from the shared optical path to a first optical path and a second optical path, respectively; a first objective lens for converging the first light beam that has been separated to the first optical path by the luminous flux separating section on the first optical information recording medium; a second objective lens made of resin for converging the second light beam that has been separated to the second optical path by the luminous flux separating section on the second optical information recording medium; and a first filtering section that is provided on a beam exit face of the second objective lens, and reduces transmittance of the first light beam to be lower than transmittance of the second light beam.

According to the foregoing structure, it is possible to realize a high performance optical head device, which is capable of recording and reproducing on and from different types of recording media with improved durability.

These and other features and advantages, which are offered by the present invention, will become more fully recognized as the detailed description thereof which follows below is read in conjunction with the associated drawings.

DETAILED DESCRIPTION OF THE INVENTION

Hereinafter, embodiments of the invention will be described with reference to the drawings.

First Embodiment

An optical head device according to one embodiment of the present invention will be explained with reference to FIG. 1 to FIG. 3.

Figure 1:
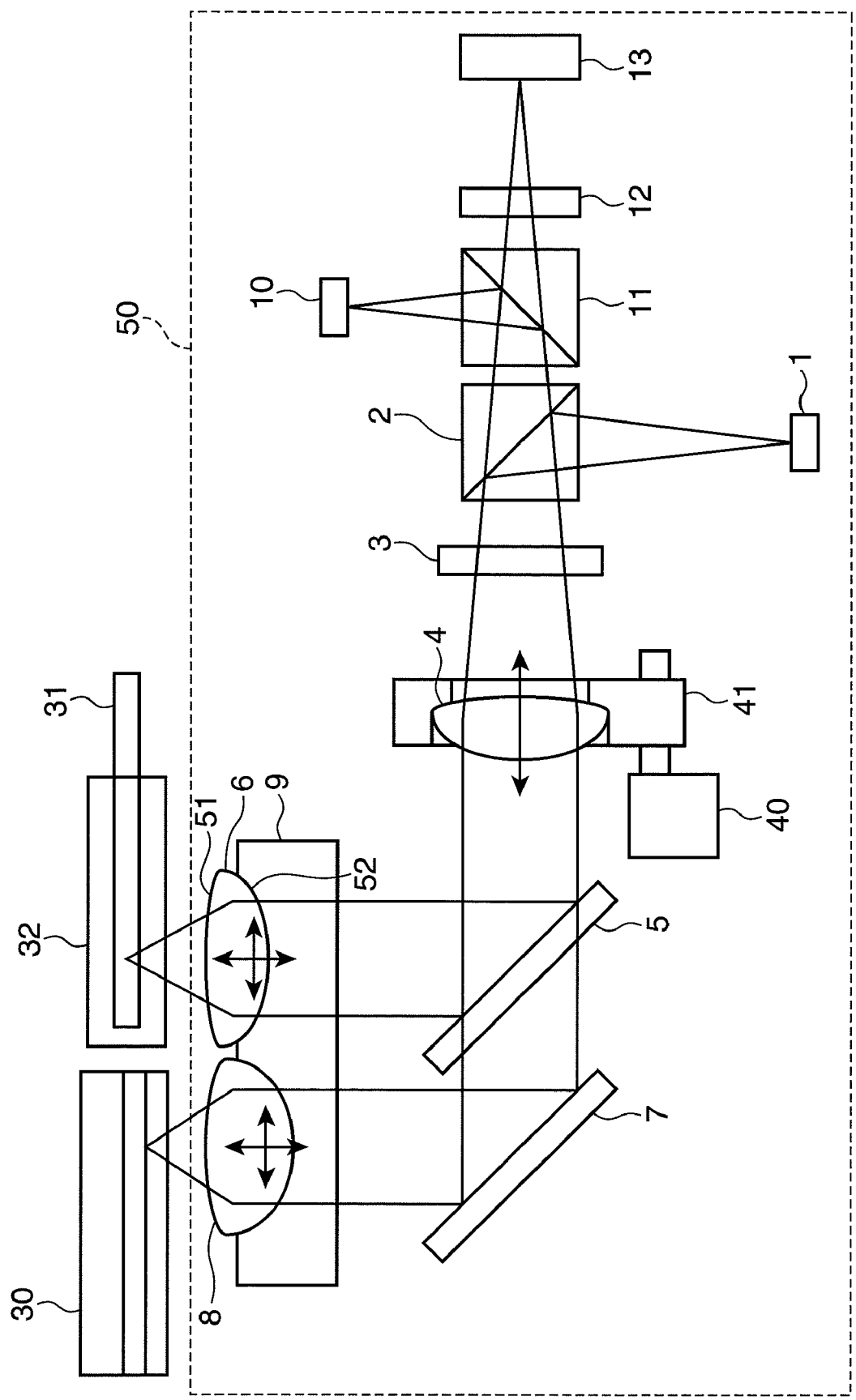
FIG. 1 is an explanatory view schematically showing structures of an optical head device according to one embodiment of the present invention.

FIG. 1 is an explanatory view schematically showing schematic structures of an optical head device according to the present embodiment. An optical head device 50 can record and reproduce with respect to mutually different types of optical information recording media such as a BD 30 (first optical information recording medium), a DVD 31 and a CD 32 (second optical information recording medium). The optical head device 50 includes a blue semiconductor laser 1, a dual wavelength semiconductor laser 10, a first beam splitter 2, a second beam splitter 11, a quarter wave plate 3, a collimate lens 4, a flat plate 5 with a wavelength selection function, a second objective lens 6, a reflection mirror 7, a first objective lens 8, a biaxial actuator 9, a detection lens 12, a three wavelength compatible photodetector 13, a first antireflection film 51, and a second antireflection film 52.

The blue semiconductor laser 1 (first light source) emits a light beam of a blue wavelength range (wavelength λ1: 390 nm to 420 nm) for recording and reproducing on and from the BD 30. The dual wavelength semiconductor laser 10 (second light source) emits a light beam of a red wavelength range for recording and reproducing on and from the DVD 31 and a light beam of an infrared wavelength range for recording and reproducing on and from the CD 32.

The first beam splitter 2 reflects the linearly polarized light beam of the blue wavelength range as emitted from the blue semiconductor laser 1 and guides it to the quarter wave plate 3. The second beam splitter 11 reflects the linearly polarized light beam of the red and infrared wavelength range as emitted from the dual wavelength semiconductor laser 10 and guides it to the quarter wave plate 3. Namely, the first beam splitter 2 and the second beam splitter 11 constitute an optical system wherein the light beam (first light beam) of the blue wavelength range and the light beam (second light beam) of the red and infrared wavelength range share the same optical path. With this structure wherein the light beam of the blue wavelength range and the light beam of the red and infrared wavelength range share the same optical path in the optical system, it is possible to realize reduction in size and cost of the optical head device.

The flat plate 5 (luminous flux separating section) with wavelength selection function selectively transmits the light beam of the blue wavelength range entered from the shared optical path and guides it to the first optical path, and selectively reflects the light beam of the red and infrared wavelength range and guides it to the second optical path. The first optical path guides the light beam of the blue wavelength range to the first objective lens 8, and the second optical path guides the light beam of the red and infrared wavelength range to the second objective lens 6.

The first objective lens 8 is designed for the light beam of the blue wavelength range for use in recording or reproducing on or from the BDs. This first objective lens 8 has a numerical aperture NA of 0.85, and is made of a material (glass, etc.) suited for the light beam in the blue wavelength range.

On the other hand, the second objective lens 6 is designed for the light beam of the red wavelength range and the infrared wavelength range for recording or reproducing on and from the DVD 31 and the CD 32. This second objective lens 6 has a numerical aperture NA of 0.65, and is made of resin in view of mass productivity and a cost reduction. Namely, the second objective lens 6 is formed at low cost by adopting an existing material optimized for the CDs and DVDs.

The first antireflection film 51 (first filtering section) is formed on a beam exit face of the second objective lens 6, and has a function of reducing the transmittance of the light beam (first light beam) in the blue wavelength range to be lower than the transmittance of the light beam (second light beam) in the red wavelength range and the infrared wavelength range. The second antireflection film 52 (second filtering section) is formed on a beam entrance face of the second objective lens 6, and has a function of reducing the transmittance of the light beam (first light beam) of the blue wavelength range to be lower than the transmittance of the light beam (second light beam) of the red wavelength range and the infrared wavelength range.

The biaxial actuator 9 for two lenses, which supports the foregoing first objective lens 8 and the second objective lens 6, drives both objective lenses 8 and 6 in the biaxial direction (two dimensionally).

Firstly, the operation of the optical head device 50 in the case of recording and reproducing information on and from the BD 30 (first optical information recording medium) is explained.

The linearly polarized laser beam as emitted from the blue semiconductor laser 1 is reflected from the beam splitter 2 and is converted into circular polarized light with the quarter wave plate 3. After the laser beam has been converted into a substantially parallel beam with the collimate lens 4, it is transmitted through the flat plate 5 with wavelength selection function, and is reflected from the reflection mirror 7. The laser beam then converges by the first objective lens 8 onto an optical spot on the information recording surface of the BD 30 through the light transmitting layer.

The laser beam reflected from the information recording surface is transmitted through the first objective lens 8 once again and is reflected from the reflection mirror 7. The reflected light is then transmitted through the collimate lens 4, and is converted into linearly polarized light, which is different from the outward path, with the quarter wave plate 3. Then, the laser beam is transmitted through the first beam splitter 2 and the second beam splitter 11, and is guided to the photodetector 13 with the detection lens 12. The laser beam detected by the photodetector 13 is subject to photoelectric conversion. The light beam is then computed in an arithmetic unit not shown. This arithmetic unit generates a focus error signal for focusing the surface fluctuation of the BD 30 and a tracking error signal for tracking the eccentricity. The biaxial actuator 9 drives the first objective lens 8 in the biaxial direction so that the optical spot tracks the information track of the BD 30 that is being rotationally driven based on the focus error signal and the tracking error signal.

The collimate lens 4 is supported by a lens holder 41, so as to be movable along the optical axis of the laser beam with the stepping motor 40. Specifically, the collimate lens 4 is controlled to move according to the thickness of each respective light transmitting layer of the information recording surface. Accordingly, for instance, when the thickness of the respective light transmitting layers is outside the prescribed range, the collimate lens 4 converts the laser beam into diverging light or converging light so as to correct the spherical aberrations caused by a change in thickness of the light transmitting layer. For the correction of the spherical aberrations, the objective lens 8 is used to generate spherical aberrations of a reverse polarity. As a result, it is possible to remove third order components, which account for the majority of the components in the generated spherical aberrations, thereby significantly reducing the spherical aberrations.

The operation of the optical head device 50 in the case of recording and reproducing on and from the DVD 31 (second optical information recording medium) is explained.

The linearly polarized laser beam in the red wavelength range as emitted from the dual wavelength semiconductor laser 10 is reflected from the second beam splitter 11, transmitted through the first beam splitter 2, and converted into circular polarized light with the quarter wave plate 3. Then, the laser beam converges into a substantially parallel light with the collimate lens 4, reflected from the flat plate 5 with wavelength selection function, and converges into an optical spot on the DVD 31 through the light transmitting layer with the second objective lens 6. The laser beam reflected from the DVD 31 is transmitted through the second objective lens 6 once again, and is reflected from the flat plate 5. The laser beam is then transmitted through the collimate lens 4, converted into linearly polarized light, which is different from the outward path, with the quarter wave plate 3, and is transmitted through the first beam splitter 2 and the second beam splitter 11. The laser beam is then guided to the photodetector 13 with the detection lens 12. The laser beam detected with the photodetector 13 is subject to photoelectric conversion. The light beam is then computed with an arithmetic unit not shown. This arithmetic unit generates a focus error signal for focusing the surface fluctuation of the DVD 31 and a tracking error signal for tracking the eccentricity. The biaxial actuator 9 drives the second objective lens 6 in the biaxial direction so that the optical spot tracks the information track of the DVD 31 that is being rotationally driven based on the focus error signal and the tracking error signal.

The operation of the optical head device 50 in the case of recording and reproducing on and from the CD 32 (second optical information recording medium) is explained.

The linearly polarized laser beam of the infrared wavelength range as emitted from the dual wavelength semiconductor laser 10 is reflected from the second beam splitter 11, transmitted through the first beam splitter 2, and is converted into circular polarized light with the quarter wave plate 3. The laser beam is then converted into a substantially parallel light with the collimate lens 4, reflected from the flat plate 5 with wavelength selection function, and converges into an optical spot on the CD 32 through the light transmitting layer with the second objective lens 6. The laser beam reflected from the CD 32 is then transmitted through the second objective lens 6 once again, and is reflected from the flat plate 5. The laser beam is then transmitted through the collimate lens 4, converted into linearly polarized light, which is different from the outward path, with the quarter wave plate 3, and is transmitted through the first beam splitter 2 and the second beam splitter 11. The laser beam is then guided to the photodetector 13 with the detection lens 12. The laser beam detected with the photodetector 13 is subject to photoelectric conversion. The laser beam is then computed with an arithmetic unit not shown. This arithmetic unit generates a focus error signal for focusing the surface fluctuation of the CD 32 and a tracking error signal for tracking the eccentricity. The biaxial actuator 9 drives the second objective lens 6 in the biaxial direction so that the optical spot tracks the information track of the CD 32 that is being rotationally driven based on the focus error signal and the tracking error signal.

Figure 2:
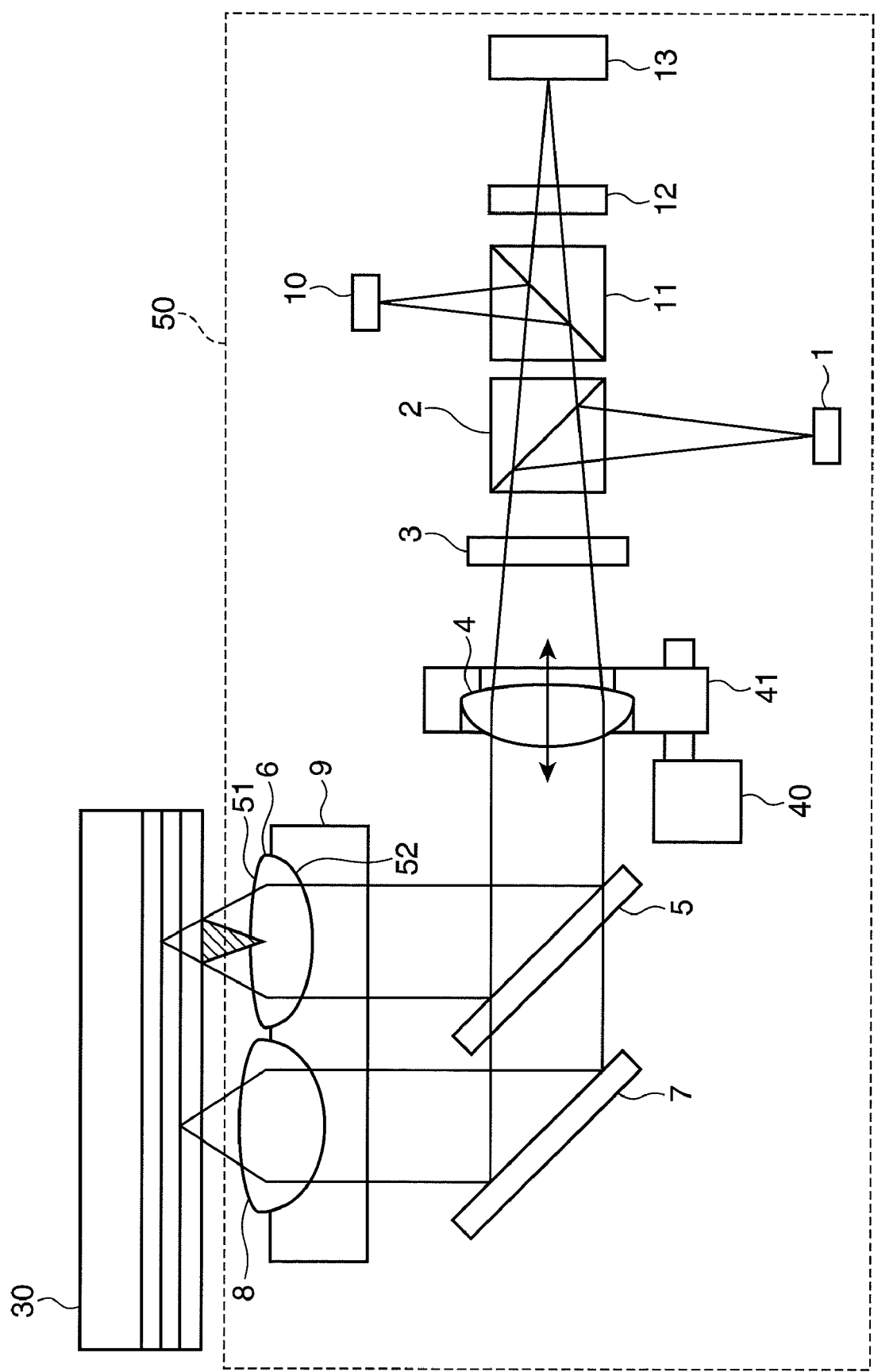
FIG. 2 is an explanatory view showing a schematic structure when the optical head device according to one embodiment of the present invention is recording or reproducing on or from a BD.

FIG. 2 is an explanatory view schematically showing the optical head device 50 when recording or reproducing on or from the BD 30. The bulk of the laser beam of the blue wavelength range as emitted from the blue semiconductor laser 1 is transmitted through the flat plate 5 with wavelength selection function, but a part of the laser beam is reflected from the flat plate 5. The laser beam reflected from the flat plate 5 converges on the BD 30 with the second objective lens 6. In this case, since the second objective lens 6 is not of an optimal design in relation to the laser beam in the blue wavelength range of the blue semiconductor laser 1, the laser beam of the blue wavelength range will converge on the BD 30 with spherical aberrations. Therefore, when the focal length of the second objective lens 6 satisfies a predetermined condition, the laser light reflected from the surface and/or the recording face of the BD 30 converges in the second objective lens 6 as illustrated by hatching in FIG. 2. For the second objective lens 6 made of the material optimized for use in the optical path of the laser beam for recording and reproducing on and from CDs and DVDs, adopted is the second objective lens 6 made of resin in view of mass productivity and cost reduction. Here, when the laser beam of the blue wavelength range converges in the second objective lens 6, which is made of resin, the resin material itself deteriorates, which in turn causes degrading of the recording and reproduction performance of CDs and DVDs.

In view of the foregoing problem, the optical head device of the present embodiment is arranged so as to provide a first antireflection film 51 on the beam exit face (face on the optical information recording medium side) of the second objective lens 6. The first antireflection film 51 is provided for preventing the reflection of the light beam (second light beam) in the red wavelength range and the infrared wavelength range and permitting the bulk thereof to be transmitted, while having a low transmittance of the light beam (first light beam) in the blue wavelength range. The first antireflection film 51 can be formed on the beam exit face of the second objective lens 6, for example, by deposition. With this structure of providing the first antireflection film 51, it is possible to effectively reduce the transmittance of only the light beam (first light beam) of the blue wavelength range that entered the second objective lens 6 without reducing the power of the light beam (second light beam) in the red wavelength range and the infrared wavelength range that is required for the recording or reproduction. As described, according to the structure wherein the first antireflection film 51 is formed on the beam exit face of the second objective lens 6, after the light beam of the blue wavelength range enters the second objective lens 6, the light beam of the blue wavelength range twice passes through the first antireflection film 51 before it converges onto a focal point in the second objective lens 6. The first passage is formed when the light beam of the blue wavelength range passes through the beam exit face of the second objective lens 6, and the second passage is formed when the light beam of the blue wavelength range is reflected from the surface or recording surface of the BD 30 and enters the second objective lens 6 again. With this structure, an amount of the light beam of the blue wavelength range, which passes through the first antireflection film 51 is reduced each time it passes through the first antireflection film 51. It is therefore possible to significantly reduce the power of the light beam of the blue wavelength range when converges in the second objective lens 6. As a result, it is possible to reduce to the minimum the adverse effects of the light beam in the blue wavelength range, when it is reflected from the flat plate 5, and it converges in the second objective lens 6.

Specifically, by setting the transmittance of the light beam of the blue wavelength range in the first antireflection film 51 to be 85% or lower, it is possible to prevent the influence on the second objective lens 6 made of resin, while maintaining the transmittance of the light beam of the red wavelength range and the infrared wavelength range at a sufficient level (90% or higher, more preferably 95% or higher) relatively with ease. It is therefore possible to ensure desirable recording and reproducing performance with respect to CDs and DVDs.

Although it is sufficiently effective to merely provide the first antireflection film 51 on the beam exit face of the second objective lens 6 as described above, the performance deterioration of the second objective lens 6 can be more surely prevented by also providing a second antireflection film 52 on the beam entrance face of the second objective lens 6. The second antireflection film 52, as with the first antireflection film 51, has a function of preventing the reflection of the light beam (second light beam) in the red wavelength range and the infrared wavelength range and causing the bulk thereof to be transmitted, and has a filter function of reducing the transmittance of the light beam of the blue wavelength range (first light beam). This second antireflection film 52 can be formed on the beam entrance face of the second objective lens 6 by deposition as in the case of the first antireflection film 51. With this second antireflection film 52, after the light beam in the blue wavelength range enters the second objective lens 6, the light beam once pass through the second antireflection film 52, and twice pass through the first antireflection film 51 before it converges onto a focal point in the second objective lens 6. According to the foregoing structure, an amount of the light beam in the blue wavelength range, which passes through the first and second antireflection films 51, 52 is reduced each time it passes through these antireflection films. It is therefore possible to significantly reduce the power when the light beam of the blue wavelength range converges in the second objective lens 6, thereby more effectively preventing the second objective lens 6 from deteriorating.

Specifically, by setting the transmittance of the light beam of the blue wavelength range in the second antireflection film 52 to be 85% or lower, it is possible to prevent the adverse effects of such light beam of the blue wavelength range on the second objective lens 6 made of resin, while ensuring the transmittance of the light beam of the red wavelength range and the infrared wavelength range relatively with ease. It is therefore possible to ensure desirable recording and reproducing performance with respect to CDs and DVDs.

Incidentally, it is preferable that the transmittance of the light beam of the blue wavelength range in the first antireflection film 51 be set to be lower than the transmittance of the light beam of the blue wavelength range in the second antireflection film 52 for the reasons set forth above. Namely, after the light beam of the blue wavelength range enters the second objective lens 6, the light beam of the blue wavelength range passes through the first antireflection film 51 more than the second antireflection film 52 before it converges onto a focal point in the second objective lens 6. With the foregoing structure, it is therefore possible to effectively reduce the amount of the light beam of the blue wavelength range, which passes through the second objective lens 6, and which adversely affects the performance of the second objective lens 6.

Moreover, as a result of setting the total transmittance of the blue wavelength range in the first antireflection film 51 and the second antireflection film 52 to 75% or lower, it is possible to prevent the adverse effects on the second objective lens 6 made of resin, while ensuring the transmittance of the light beam of the red wavelength range and the infrared wavelength range can be sufficiently relatively with ease. As a result, it is possible to ensure desirable recording and reproducing performances of the CDs and DVDs.

It is also arranged such that the thickness of the second objective lens 6 is designed so that the light beam of the blue wavelength range that is reflected from the first antireflection film 51 without passing through the second objective lens 6 will not converge in the second objective lens 6. With this structure, by providing the first antireflection film 51 on the beam exit face of the second objective lens 6, it is possible to prevent the second objective lens 6 from deteriorating.

Figure 3:
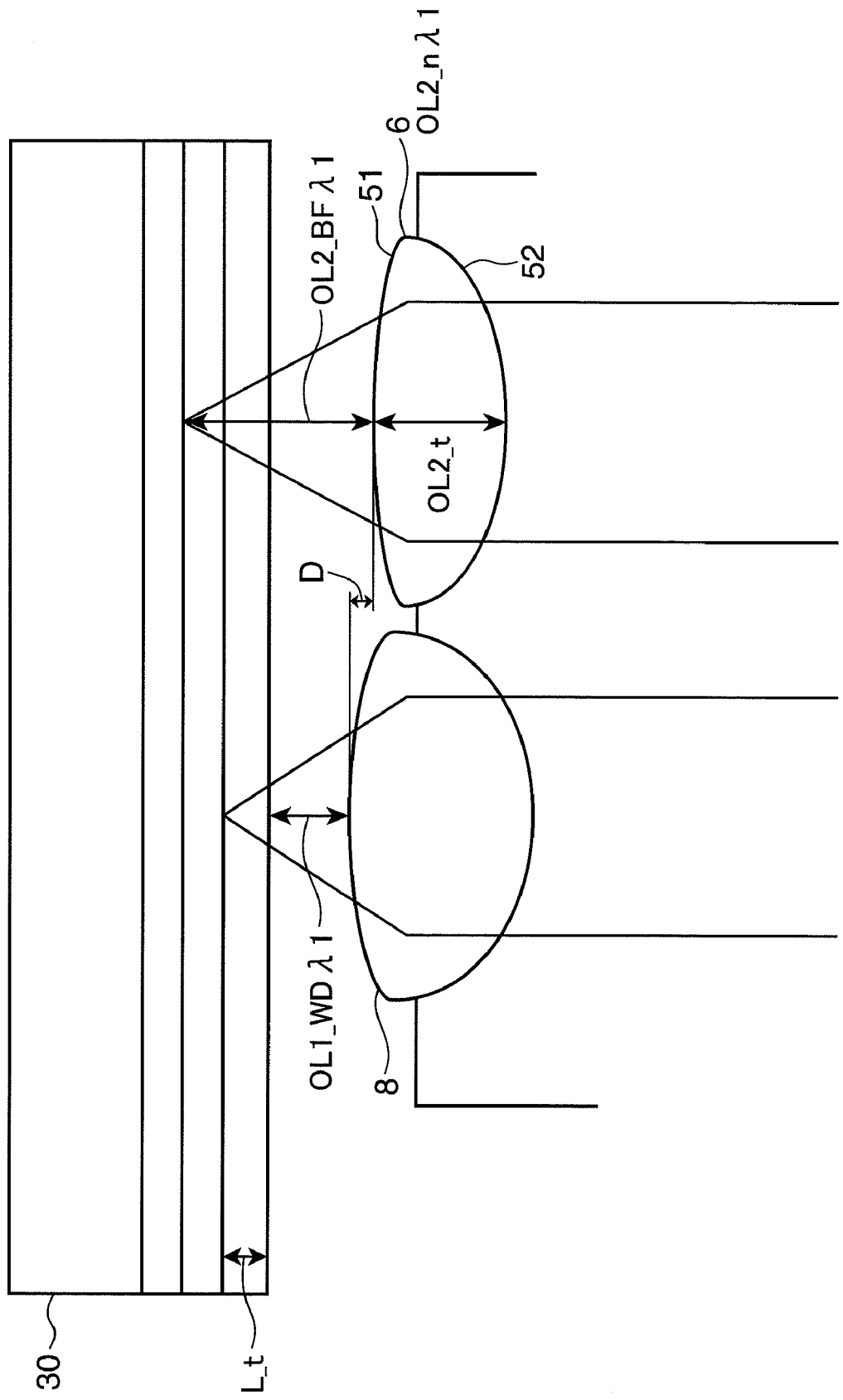
FIG. 3 is an explanatory view showing a positional relationship between two objective lenses according to one embodiment of the present invention.

As shown in FIG. 3, when the relative positions of the first objective lens 8 and the second objective lens 6 have the following relationship, the light beam of the blue wavelength range that reflected from the surface or the recording surface of the BD 30 converges in the second objective lens 6. Specifically, when the following condition (1) or (2) holds, it becomes outstanding the adverse effects of the light beam in the blue wavelength range which enters the second objective lens 6. In this case, the effects as achieved from the structure of the present embodiment wherein the first antireflection film 51 and the second antireflection film 52 are provided can be particularly appreciated.

[Formula 1]

$$\left[ (OL1\_WD\lambda1 + D) \times 2 + \frac{OL2\_t}{OL2\_n\lambda1} \right] > \quad (1)$$

$$OL2\_BF\lambda1 > [(OL1\_WD\lambda1 + D) \times 2]$$

OL1_WDλ1: working distance (mm) of first objective lens 8 at wavelength λ1

D: difference (mm) between the beam exit face position of the first objective lens 8 and the beam exit face position of the second objective lens 6 (the distance has a positive value when the beam exit face position of the first objective lens 8 is higher (closer to the optical information recording medium), while having a negative value when the beam exit face position of the second objective lens 6 is higher (closer to the optical information recording medium)

OL2_t: thickness (mm) of second objective lens 6

OL2_nλ1: refractive index (mm) of second objective lens 8 at wavelength λ1

OL2_BFλ1: back focus (mm) of second objective lens 6 at wavelength λ1

[Formula 2]

$$\left[ (OL1\_WD\lambda1 + D) \times 2 + \frac{OL2\_t}{OL2\_n\lambda1} \right] > \quad (2)$$

$$OL2\_BF\lambda1 - \left( \frac{L\_t}{L\_n\lambda1} \right) \times 2 > [(OL1\_WD\lambda1 + D) \times 2]$$

OL1_WDλ1: working distance (mm) of first objective lens 8 at wavelength λ1,

D: difference (mm) between the beam exit face position of the first objective lens 8 and the beam exit face position of the second objective lens 6 (the distance has a positive value when the beam exit face position of the first objective lens 8 is higher (closer to the optical information recording medium), while having a negative value when the beam exit face position of the second objective lens 6 is higher (closer to the optical information recording medium)

OL2_t: thickness (mm) of second objective lens 6

OL2_n$\lambda$1: refractive index (mm) of second objective lens 8 at wavelength $\lambda$1

OL2_BF$\lambda$1: back focus (mm) of second objective lens 6 at wavelength $\lambda$1

L_t: thickness (mm) of light transmitting layer at predetermined information recording surface of BD 30

L_n$\lambda$1: refractive index (mm) of light transmitting layer of BD30 at wavelength $\lambda$1

Incidentally, the present embodiment may be arranged such that the light beam of the blue wavelength range (first light beam) is selectively reflected from the flat plate 5 with wavelength selection function, while selectively transmitting the light beam (second light beam) of the red wavelength range and the infrared wavelength range. Namely, the respective positions of the first objective lens 8 and the second objective lens 6 may be switched. It is needless to mention that the same effects can be achieved from this structure.

Second Embodiment

Another embodiment of the present invention will be explained with reference to FIG. 4.

The basic structure of the optical head device 60 of the present embodiment is the same as that of the optical head device 50 of the first embodiment. Therefore, those members having the same functions and structures are designated by the same reference numerals, and the explanations thereof may be omitted here. In this embodiment, explanations will be given mainly on the distinctive structures.

The optical head device 60 according to the present embodiment will be explained with reference to FIG. 4.

Figure 4:
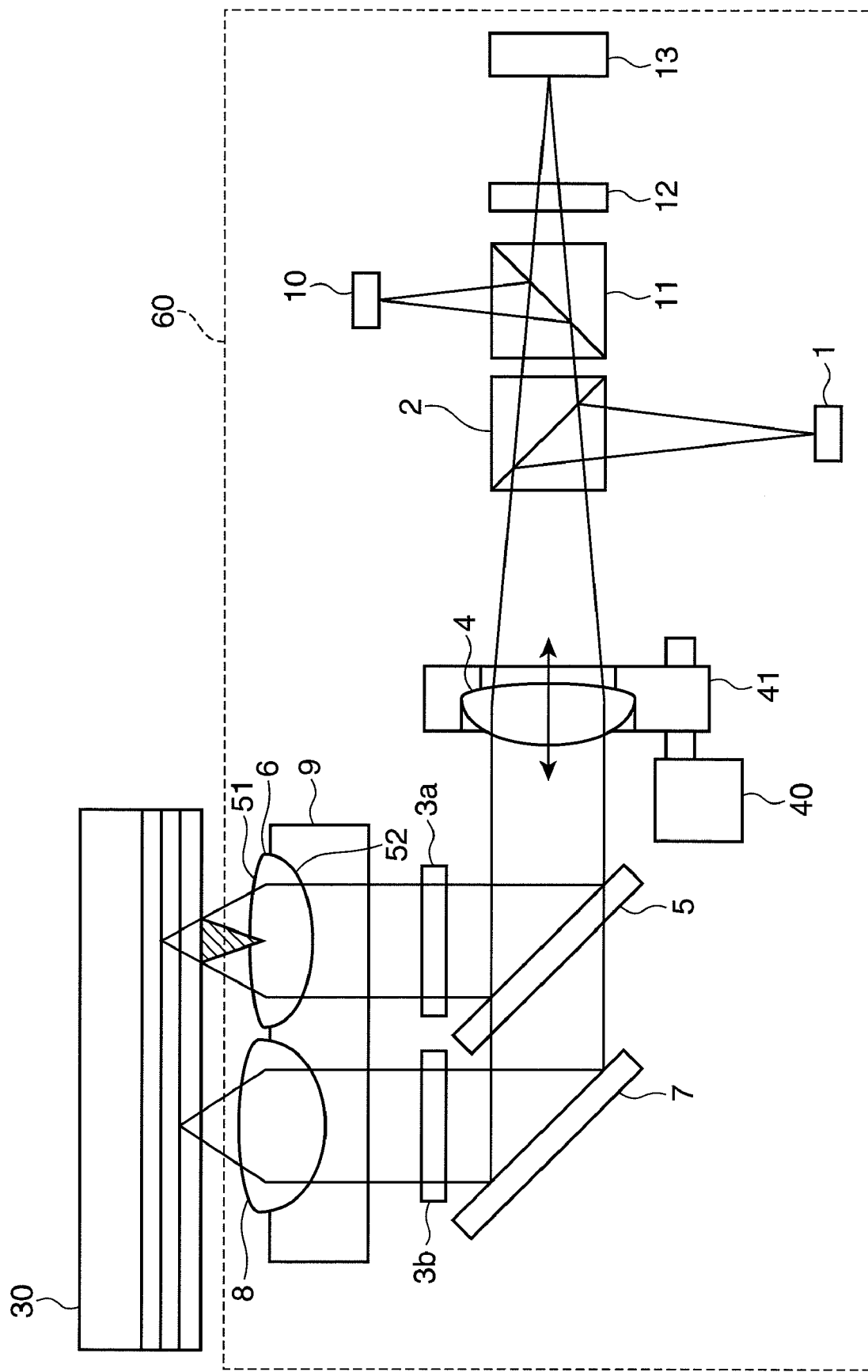
FIG. 4 is an explanatory view schematically showing structures of an optical head device according to another embodiment of the present invention.

The optical head device 60 illustrated in FIG. 4 differs from the optical head device of the first embodiment in that it adopts a quarter wave plate 3*a* (optical element) for CDs and DVDs and a quarter wave plate 3*b* for BDs, respectively, in substitute for the quarter wave plate 3 of the first embodiment. The quarter wave plate 3*a* is provided between the flat plate 5 and the second objective lens 6, and the quarter wave plate 3*b* is provided between the reflection mirror 7 and the first objective lens 8.

On the surface of the quarter wave plate 3*a*, formed is an antireflection film for reducing the transmittance of the light beam of the blue wavelength range (first light beam) to be lower than the transmittance of the light beam (second light beam) of the red wavelength range and the infrared wavelength range. With this structure, it is possible to effectively reduce the transmittance of only the light beam (first light beam) of the blue wavelength range that entered the second objective lens 6 without reducing the power of the light beam (second light beam) in the red wavelength range and the infrared wavelength range that is required for the recording or reproduction. It is therefore possible to more effectively prevent deterioration of the performance of the second objective lens 6.

Moreover, by setting the transmittance of the light beam of the blue wavelength range in the quarter wave plate 3*a* to be 2% or lower, influences on the light beam of the blue wavelength range can be prevented. It is therefore possible to ensure desirable recording and reproducing performance of the CDs and DVDs.

Although the present embodiment has been explained through the case of providing the quarter wave plate 3*a* between the flat plate 5 and the second objective lens 6, the present invention is not limited to this structure, and other optical element which has a function of reducing the transmittance of the light beam of the blue wavelength range (first light beam) to be lower than the transmittance of the light beam (second light beam) of the red wavelength range and the infrared wavelength range may be provided between the flat plate 5 and the second objective lens 6.

Third Embodiment

A still another embodiment according to the present invention is explained with reference to FIG. 5.

The basic structure of the optical head device of the present embodiment is the same as that of the optical head device 50 of the first embodiment. Therefore, those members having the same functions and structures are designated by the same reference numerals, and the explanations thereof may be omitted here. In this embodiment, explanations will be given mainly on the distinctive structures.

Figure 5:
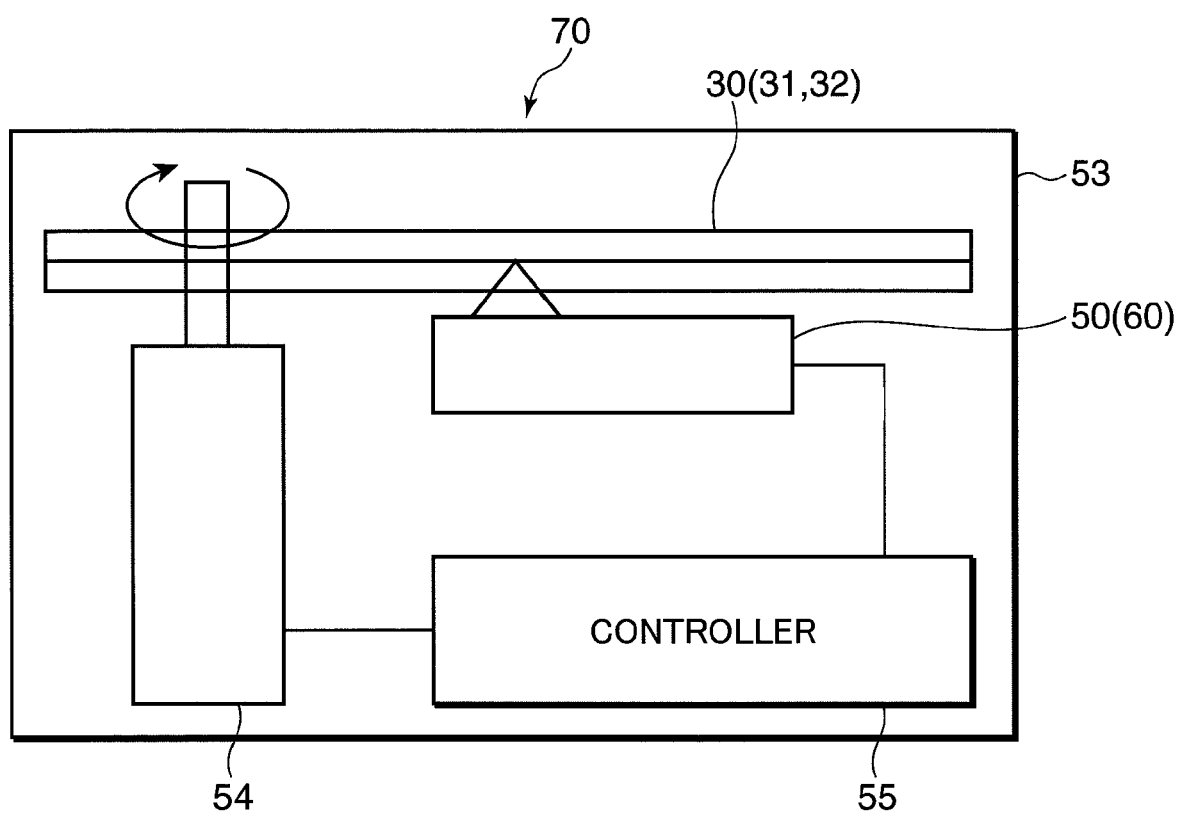
FIG. 5 is an explanatory view schematically showing structures of a recording/reproduction device according to still another embodiment of the present invention.

FIG. 5 is an explanatory view schematically showing the structure of a recording/reproduction device 70 in accordance with the present embodiment. The recording/reproduction device 70 is provided with the optical head device 50 of the first embodiment or the optical head device 60 of the second embodiment, and has the compatibility of recording or reproducing on or from different types of optical information recording media (BDs, DVDs, CDs).

As shown in FIG. 5, the recording/reproduction device 70 is provided for recording or reproducing on or from the BD 30 (DVD 31 or CD 32). The recording/reproduction device 70 includes within a chassis 53, an optical information recording medium drive unit 54, a controller 55, and an optical head device 50 (or 60). The optical information recording medium drive unit 54 has the function of rotationally driving the different types of optical information recording media (BDs, DVDs, and CDs), respectively. The optical head device 50 (or 60) is the optical head device explained in the first embodiment or the second embodiment. The controller 55 has the function of driving and controlling the optical information recording medium drive unit 54 and the optical head device 50 (or 60), as well as the function of performing signal processing of the control signals and information signals as optically received in the optical head device 50 (or 60), and the function of interfacing the information signals externally and internally of the chassis 53.

Since the recording/reproduction device 70 is equipped with the optical head device 50 or 60 of the first embodiment or the second embodiment, it is possible to ensure the durability of the second objective lens 6 (refer to FIG. 1 and FIG. 4) using a resin material optimized for use in the optical path of the laser beam for recording and reproducing with respect to the CDs and DVDs, and consequently possible to ensure the recording and/or reproduction characteristics of BDs, DVDs and CDs.

In the foregoing embodiments of the present invention, explanations have been given through the case of adopting BDs, DVDs and CDs for the different types of optical information recording media; however, the present invention is not intended to be limited thereto. Specifically, the present invention can be applied to an optical head device provided with a laser light source which emits light in the blue wavelength range, which is capable of recording and reproducing with respect to at least two different types of optical information recording media, and a recording and/or reproduction device adopting such optical head device.

As described, the optical head device according to one aspect of the present invention, which is capable of recording and reproducing on and from a first optical information recording medium and a second optical information recording medium of mutually different types includes: a first light source for emitting a first light beam having a wavelength λ1 of 390 nm to 420 nm; a second light source for emitting a second light beam having a wavelength λ2 that is longer than the wavelength λ1; an optical system in which the first light beam and the second light beam share the same optical path; a luminous flux separating section for selectively separating the first light beam and the second light beam entering from the shared optical path to a first optical path and a second optical path, respectively; a first objective lens for converging the first light beam that has been separated to the first optical path by the luminous flux separating section on the first optical information recording medium; a second objective lens made of resin for converging the second light beam that has been separated to the second optical path by the luminous flux separating section on the second optical information recording medium; and a first filtering section that is provided on a beam exit face of the second objective lens, and reduces transmittance of the first light beam to be lower than transmittance of the second light beam.

According to the foregoing structure, the first light beam having a wavelength λ1 (390 nm to 420 mn) is emitted from the first light source for recording or reproducing on and from the first optical information recording medium, and the second light beam having a wavelength λ2 that is longer than the wavelength λ1 is emitted from the second light source for recording or reproducing on or from the second optical information recording medium, which is a different type from the first optical information recording medium. For example, a BD may be adopted as an example of the first optical information recording medium and a CD or a DVD may be adopted as an example of the second optical information recording medium. With this structure wherein the same optical path is shared by the first light beam and the second light beam by means of the optical system, it is possible to reduce the size and the cost of the optical head device.

According to the foregoing structure, the first light beam and the second light beam which pass through the shared optical path can be separated by the luminous flux separating section before being incident onto the first optical information recording medium or the second optical information recording medium. Specifically, when recording or reproducing on or from the first optical information recording medium, the first light beam separated to the first optical path converges on the first optical information recording medium by the first objective lens. On the other hand, when recording or reproducing on or from the second optical information recording medium, the second light beam separated to the second optical path converges on the second optical information recording medium by the second objective lens. With the foregoing structure wherein the shared optical path is separated once again, and the first light beam is guided to the first objective lens that is exclusive for the first light beam while guiding the second light beam to the second objective lens that is exclusive for the second light beam respectively. As a result, the first light beam can be prevented from entering into the second objective lens made of resin to the minimum.

Nevertheless, when recording or reproducing on or from the first optical information recording medium, if the first light beam that has not been guided to the first optical path with the luminous flux separating section and even slightly heads toward the second optical path, such first light beam will enter the second objective lens made of resin. Here, since the second objective lens is not designed for the first light beam of the wavelength λ1, the first light beam will converge on the recording medium surface with spherical aberrations. Here, when the focal length of the second objective lens satisfies a predetermined condition, the laser light reflected from the surface and/or the recording face of the first optical information recording medium converges in the second objective lens. The second objective lens, which is made of resin in view of mass productivity and cost reduction, has an optimal design for the light beam having the wavelength λ2; however, it is liable to deteriorate as being affected by the light beam having the wavelength λ1. In particular, when the first light beam of the wavelength λ1 converges on a focal point in the second objective lens as described above, the power density will be maximized at such focal point, which in turn causes deterioration of the second objective lens made of resin. Since the second objective lens has the first light beam converged therein, it is liable to be affected by the first light beam as compared to other components. Even with a small amount of the first light beam, the second objective lens becomes less durable, which deteriorates the performance of the second objective lens. Since this second objective lens is an essential component of the optical head device, such deterioration of the second objective lens will significantly degrades the performance of the entire optical head device.

In view of the foregoing problem, the optical head device of the present invention has a first filtering section which has a function of reducing the transmittance of the first light beam to be lower than the transmittance of the second light beam provided on the beam exit face of the second objective lens. With this structure of providing the first filtering section, it is possible to effectively reduce the transmittance of only the first light beam that entered the second objective lens without reducing the power of the second light beam required for recording or reproduction. As described, according to the structure wherein the first filtering section is formed on the beam exit face of the second objective lens, after the first light beam enters the second objective lens, the first light beam twice passes through the first filtering section before it converges onto a focal point in the second objective lens (A: when the first light beam is emitted from the beam exit face of the second objective lens to the recording medium surface, and B: when first light beam is reflected from the recording medium surface and once again enters the second objective lens). With this structure, an amount of the first light beam, which passes through the first filtering section, is reduced each time it passes through the first filtering section. It is therefore possible to significantly reduce the power of the first light beam of the blue wavelength range when converges in the second objective lens. By significantly reducing the deterioration in the performance of the second objective lens, it is therefore possible to realize a high performance optical head device that is compatible with recording on or reproducing different types of recording mediums with improved durability.

With the foregoing structure, it is preferable to further include a second filtering section provided on the beam entrance face of the second objective lens, for reducing the transmittance of the first light beam to be lower than the transmittance of the second light beam.

According to the foregoing structure wherein the second filtering section is formed on the beam entrance face of the second objective lens, after the first light beam enters the second objective lens, the first light beam will once pass through the second filtering section and twice pass through the first filtering section before it forms a focal point in the second objective lens. Since the first light beam will be shielded each time it passes through the first and second filtering sections, it will be possible to further reduce the power when the first light beam converges in the second objective lens, thereby preventing deterioration of the performance of the second objective lens more effectively.

It is preferable that the transmittance of the first light beam in the first filtering section be set to be lower than the transmittance of the first light beam in the second filtering section.

As described, after the first light beam enters the second objective lens, the first light beam once passes through the second filtering section and twice passes through the first filtering section before a focal point is formed in the second objective lens. Therefore, by setting the transmittance of the first light beam in the first filtering section to be lower than the transmittance of the first light beam in the second filtering section, it is possible to effectively shield the first light beam.

It is preferable that the transmittance of the first light beam in the first filtering section be set to 85% or lower.

According to the foregoing structure wherein the transmittance of the first light beam in the first filtering section is set to around 85%, it is possible to design the first filtering section with ease without hardly affecting the transmission of the second light beam of wavelength $\lambda 2$, while ensuring the effect of preventing deterioration of the performance of the second objective lens. Thus, preferably, the transmittance of the first light beam in the first filtering section is set to 85% or lower.

It is preferable that the transmittance of the first light beam in the second filtering section be set to 85% or lower.

If the transmittance of the first light beam is set to around 85%, the second filtering section can be easily designed without hardly affecting the transmittance of the second light beam of wavelength $\lambda 2$, and the effect of avoiding the performance deterioration of the second objective lens can also be sufficiently obtained. Thus, preferably, the transmittance of the first light beam in the second filtering section is set to 85% or lower.

According to the foregoing structure wherein the transmittance of the first light beam in the second filtering section is set to around 85%, it is possible to design the second filtering section with ease without hardly affecting the transmittance of the second light beam of wavelength $\lambda 2$, while ensuring the effect of preventing deterioration of the performance of the second objective lens. Thus, preferably, the transmittance of the first light beam in the first It is preferable that the transmittance of the second light beam in the first filtering section be set to 90% or higher.

It is preferable that the transmittance of the second light beam in the second filtering section is set to 90% or higher.

It is preferable that the transmittance of the first light beam that passes through the first filtering section and the second filtering section formed on the second objective lens be 75% or lower.

According to the foregoing structure wherein the total transmittance of the first light beam in the first filtering section and the second filtering section is set to around 75%, the first filtering section and the second filtering section can be designed with ease without hardly affecting the transmittance of the second light beam of wavelength $\lambda 2$, while ensuring the effect of preventing deterioration of the performance of the second objective lens. Thus, preferably, the total transmittance of the first light beam in the first filtering section and the second filtering section is set to 75% or lower.

Preferably, the first objective lens and the second objective lens satisfy the following relationship.

[Formula 1]

$$\left[(OL1\_WD\lambda 1 + D) \times 2 + \frac{OL2\_t}{OL2\_n\lambda 1}\right] > \qquad (1)$$
$$OL2\_BF\lambda 1 > [(OL1\_WD\lambda 1 + D) \times 2]$$

OL1_WD$\lambda$1: working distance (mm) of first objective lens at wavelength $\lambda 1$ D: difference (mm) between the beam exit face position of the first objective lens and the beam exit face position of the second objective lens which are mounted to biaxial actuator (the distance has a positive value when the beam exit face position of the first objective lens is higher (closer to the optical information recording medium), while having a negative value when the beam exit face position of the second objective lens is higher (closer to the optical information recording medium)

OL2_t: thickness (mm) of second objective lens

OL2_n$\lambda$1: refractive index (mm) of second objective lens at wavelength $\lambda 1$ OL2_BF$\lambda$1: back focus (mm) of second objective lens at wavelength $\lambda 1$ Preferably, the first objective lens and the second objective lens satisfy the following relationship.

[Formula 2]

$$\left[(OL1\_WD\lambda 1 + D) \times 2 + \frac{OL2\_t}{OL2\_n\lambda 1}\right] > \qquad (2)$$
$$OL2\_BF\lambda 1 - \left(\frac{L\_t}{L\_n\lambda 1}\right) \times 2 > [(OL1\_WD\lambda 1 + D) \times 2]$$

OL1_WD$\lambda$1: working distance (mm) of first objective lens at wavelength $\lambda 1$ D: difference (mm) between the beam exit face position of the first objective lens and the beam exit face position of the second objective lens which are mounted to biaxial actuator (the distance has a positive value when the beam exit face position of the first objective lens is higher (closer to the optical information recording medium), while having a negative value when the beam exit face position of the second objective lens is higher (closer to the optical information recording medium)

OL_t: thickness (mm) of second objective lens

OL2_n$\lambda$1: refractive index (mm) of second objective lens at wavelength $\lambda 1$ OL2_BF$\lambda$1: back focus (mm) of second objective lens at wavelength $\lambda 1$ L_t: thickness (mm) of light transmitting layer at predetermined information recording surface of first optical information recording medium L_n$\lambda$1: refractive index (mm) of light transmitting layer of first optical information recording medium at wavelength $\lambda 1$.

When the first objective lens and the second objective lens hold the above condition, it becomes outstanding the adverse effects of the first light beam which enters the second objective lens. In this case, the effects as achieved from the structure of the present embodiment wherein the first filtering section and the second filtering section are provided can be particularly appreciated.

Preferably, the second objective lens has a thickness such that the first light beam reflected by the first filtering section does not converge in the second objective lens.

According to the foregoing structure, the thickness of the second objective lens is designed so that the first light beam reflected from the first filtering section without passing being transmitted through the second objective lens will not converge in the second objective lens. With this structure of providing the first filtering section on the beam exit face of the second objective lens, it is possible to prevent deterioration of the performance of the second objective lens.

With the foregoing structure, it is preferable that an optical element be provided between the luminous flux separating section and the second objective lens, for reducing the transmittance of the first light beam to be lower than the transmittance of the second light beam.

According to the foregoing case, based on the optical element provided between the luminous flux separating section and the second objective lens, the first light beam that enters the second objective lens can be effectively shielded without reducing the power of the second light beam required for the recording or reproducing. As a result, it is possible to surely prevent deterioration of the performance of the second objective lens.

Preferably, the transmittance of the first light beam in the optical element be set to 2% or lower.

By setting the transmittance of the first light beam in the optical element to be 2% or lower, it is possible to more effectively prevent deterioration of the performance of the second objective lens more surely.

For instance, a wave plate may be, for example, the optical element.

A recording/reproduction device according to another aspect of the present invention includes the optical head device of any of the foregoing structures, and a controller for controlling the optical head device and causing the optical head device to perform at least recording or reproduction information on or from the first optical information recording medium and the second optical information recording medium.

According to the foregoing structure, it is possible to realize a recording/reproduction device that is compatible with recording on or reproducing different types of recording mediums by using a high performance optical head device with improved durability.

The present invention suppresses deterioration in durability of an optical component using a material optimized for use in an optical path of a laser beam for recording and reproducing on and from the CDs and DVDs in an optical head device that uses a light source including a blue semiconductor laser, and is suitably applied to an optical head device or a recording and/or reproduction device that performs recording and/or reproduction with respect to CDs, DVDs, and BDs.

This application is based on Japanese Patent Application No. 2008-202831 filed on Aug. 6, 2008, the contents of which are hereby incorporated by reference.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical head device capable of recording and reproducing on and from a first optical information recording medium and a second optical information recording medium of different types, comprising:

a first light source for emitting a first light beam having a wavelength $\lambda 1$ of 390 nm to 420 nm;

a second light source for emitting a second light beam having a wavelength $\lambda 2$ that is longer than the wavelength $\lambda 1$;

an optical system in which the first light beam and the second light beam share a same optical path;

a luminous flux separating section for selectively separating the first light beam and the second light beam which enter from the shared optical path to a first optical path and a second optical path, respectively;

a first objective lens for converging the first light beam separated to the first optical path by the luminous flux separating section onto the first optical information recording medium;

a second objective lens made of resin for converging the second light beam separated to the second optical path by the luminous flux separating section onto the second optical information recording medium; and a first filtering section formed on a beam exit face of the second objective lens, for reducing a transmittance of the first light beam to be lower than a transmittance of the second light beam, wherein the first objective lens and the second objective lens satisfy the following condition (1):

[Formula 1]

$$\left[(OL1\_WD\lambda 1 + D) \times 2 + \frac{OL2\_t}{OL2\_n\lambda 1}\right] > \quad (1)$$

$$OL2\_BF\lambda 1 > [(OL1\_WD\lambda 1 + D) \times 2]$$

OL1_WD$\lambda 1$: working distance (mm) of the first objective lens at the wavelength $\lambda 1$ D: difference (mm) between a beam exit face position of the first objective lens and the beam exit face position of the second objective lens which are mounted to a biaxial actuator (the difference having a positive value when the beam exit face position of the first objective lens is higher (closer to the first optical information recording medium), and having a negative value when the beam exit face position of the second objective lens is higher (closer to the second optical information recording medium)

OL2_t: thickness (mm) of the second objective lens

OL2_n$\lambda 1$ : refractive index (mm) of the second objective lens at the wavelength $\lambda 1$ OL2_BF$\lambda 1$ : back focus (mm) of the second objective lens at the wavelength $\lambda 1$.

2. The optical head device according to claim 1, further comprising a second filtering section formed on a beam entrance face of the second objective lens, for reducing the transmittance of the first light beam to be lower than the transmittance of the second light beam.

3. The optical head device according to claim 2, wherein the transmittance of the first light beam in the first filtering section is set to be lower than the transmittance of the first light beam in the second filtering section.

4. The optical head device according to claim 1, wherein the transmittance of the first light beam in the first filtering section is set to 85% or lower.

5. The optical head device according to claim 1, wherein the transmittance of the second light beam in the first filtering section is set to 90% or higher.

6. The optical head device according to claim 2, wherein the transmittance of the first light beam in the second filtering section is set to 85% or lower.

7. The optical head device according to claim 2, wherein the transmittance of the second light beam in the second filtering section is set to 90% or higher.

8. The optical head device according to claim 2, wherein the transmittance of the first light beam that passes through the first filtering section and the second filtering section on the second objective lens is 75% or lower.

9. An optical head device capable of recording and reproducing on and from a first optical information recording medium and a second optical information recording medium of different types, comprising:
- a first light source for emitting a first light beam having a wavelength λ1 of 390 nm to 420 nm;
- a second light source for emitting a second light beam having a wavelength λ2 that is longer than the wavelength λ1;
- an optical system in which the first light beam and the second light beam share a same optical path;
- a luminous flux separating section for selectively separating the first light beam and the second light beam which enter from the shared optical path to a first optical path and a second optical path, respectively;
- a first objective lens for converging the first light beam separated to the first optical path by the luminous flux separating section onto the first optical information recording medium;
- a second objective lens made of resin for converging the second light beam separated to the second optical path by the luminous flux separating section onto the second optical information recording medium; and
- a first filtering section formed on a beam exit face of the second objective lens, for reducing a transmittance of the first light beam to be lower than a transmittance of the second light beam, wherein the first objective lens and the second objective lens satisfy the following condition (2):

[Formula 2]

$$\left[(OL1\_WD\lambda 1 + D) \times 2 + \frac{OL2\_t}{OL2\_n\lambda 1}\right] > \quad (2)$$

$$OL2\_BF\lambda 1 - \left(\frac{L\_t}{L\_n\lambda 1}\right) \times 2 > [(OL1\_WD\lambda 1 + D) \times 2]$$

OL1_WDλ1: working distance (mm) of the first objective lens at the wavelength λ1

D: difference (mm) between a beam exit face position of the first objective lens and the beam exit face position of the second objective lens which are mounted to a biaxial actuator (the difference having a positive value when the beam exit face position of the first objective lens is higher (closer to the first optical information recording medium), and having a negative value when the beam exit face position of the second objective lens is higher (closer to the second optical information recording medium)

OL2_t: thickness (mm) of the second objective lens

OL2_nλ1: refractive index (mm) of the second objective lens at the wavelength λ1

OL2_BFλ1: back focus (mm) of the second objective lens at the wavelength λ1

L_t: thickness (mm) of a light transmitting layer at a predetermined information recording surface of the first optical information recording medium L_nλ1: refractive index (mm) of the light transmitting layer of the first optical information recording medium at the wavelength λ1.

10. The optical head device according to claim 9, further comprising a second filtering section formed on a beam entrance face of the second objective lens, for reducing the transmittance of the first light beam to be lower than the transmittance of the second light beam.

11. The optical head device according to claim 10, wherein the transmittance of the first light beam in the first filtering section is set to be lower than the transmittance of the first light beam in the second filtering section.

12. The optical head device according to claim 9, wherein the transmittance of the first light beam in the first filtering section is set to 85% or lower.

13. The optical head device according to claim 9, wherein the transmittance of the second light beam in the first filtering section is set to 90% or higher.

14. The optical head device according to claim 10, wherein the transmittance of the first light beam that passes through the first filtering section and the second filtering section on the second objective lens is 75% or lower.

15. The optical head device according to claim 1, wherein the second objective lens has a thickness such that the first light beam reflected by the first filtering section does not converge in the second objective lens.

16. The optical head device according to claim 1, further comprising an optical element provided between the luminous flux separating section and the second objective lens, and reducing the transmittance of the first light beam to be lower than the transmittance of the second light beam.

17. The optical head device according to claim 16, wherein the transmittance of the first light beam in the optical element is set to 2% or lower.

18. The optical head device according to claim 16, wherein the optical element is a wave plate.

19. A recording/reproduction device, comprising:
- the optical head device according to claim 1; and
- a controller for controlling the optical head device and causing the optical head device to perform at least recording or reproduction of information on or from the first optical information recording medium and the second optical information recording medium.

20. The optical head device according to claim 9, wherein the second objective lens has a thickness such that the first light beam reflected by the first filtering section does not converge in the second objective lens.

21. The optical head device according to claim 9, further comprising an optical element provided between the luminous flux separating section and the second objective lens, and reducing the transmittance of the first light beam to be lower than the transmittance of the second light beam.

22. The optical head device according to claim 21, wherein the transmittance of the first light beam in the optical element is set to 2% or lower.

23. The optical head device according to claim 21, wherein the optical element is a wave plate.

24. A recording/reproduction device, comprising:
- the optical head device according to claim 9; and
- a controller for controlling the optical head device and causing the optical head device to perform at least recording or reproduction of information on or from the first optical information medium and the second optical information recording medium.

* * * * *